United States Patent [19]

Gunji et al.

[11] Patent Number: 4,836,657
[45] Date of Patent: Jun. 6, 1989

[54] OPTICAL CHANGE-OVER SWITCH UTILIZING FERROELECTRIC LIQUID CRYSTAL MATERIAL

[75] Inventors: Yasuhiro Gunji, Hitachi; Sadayuki Okada, Katsuta; Masato Isogai; Katsumi Kondo, both of Hitachi; Masahiko Ibamoto, Katsuta; Kazuhiro Kuwabara; Atsushi Kanke, both of Hitachi, all of Japan

[73] Assignee: Hitachi, Ltd., Tokyo, Japan

[21] Appl. No.: 940,491

[22] Filed: Dec. 10, 1986

[30] Foreign Application Priority Data

Dec. 12, 1985 [JP] Japan ................ 60-277916
Dec. 27, 1985 [JP] Japan ................ 60-292753
Feb. 4, 1986 [JP] Japan ................ 61-21194

[51] Int. Cl.[4] .............................. G02F 1/13
[52] U.S. Cl. ..................... 350/350 S; 350/333; 350/334; 350/347 E
[58] Field of Search .......... 350/334, 350 S, 347 E, 350/347 V, 333, 341, 340, 346

[56] References Cited

U.S. PATENT DOCUMENTS

| | | | |
|---|---|---|---|
| 4,272,162 | 6/1981 | Togashi et al. | 350/347 R |
| 4,278,327 | 7/1981 | McMahon et al. | 350/334 |
| 4,333,708 | 6/1982 | Boyd et al. | 350/341 |
| 4,367,924 | 1/1983 | Clark et al. | 350/350 S |
| 4,398,805 | 8/1983 | Cole | 350/347 R |
| 4,493,531 | 1/1985 | Bohmer et al. | 350/334 |
| 4,682,858 | 7/1987 | Kanbe et al. | 350/350 S |
| 4,720,171 | 1/1988 | Baker | 350/334 |
| 4,720,172 | 1/1988 | Baker | 350/334 |

OTHER PUBLICATIONS

Boyd et al, "Liquid Crystal Orientational Bistability and Nematic Storage Effects", J. Appl. Phys. 36(7), Apr. 1, 1980, p. 556.
Cheng, "Surface Pinning of Disclinations and the Stability of Bistable Nematic Storage Displays", J. Appl. Phys. 52(2) Feb. 1981.
Soref et al, "Total Switching of Unpolarized Fiber Light with a Four-port Electro-Optic Liquid-Crystal Device", Opt. Society of America, 1980.

Primary Examiner—Stanley D. Miller
Assistant Examiner—Huy Kim Mai
Attorney, Agent, or Firm—Antonelli, Terry & Wands

[57] ABSTRACT

The liquid crystal cell (30) for the optical change-over switch comprises a pair of transparent substrates (1), a pair of transparent flat electrodes (2) provided on the respective opposing surfaces of the substrates, orientation control films (3) provided on the flat electrodes (2), two pair of comb shaped electrodes (33) respectively provided on the orientation control films (3), and a ferroelectric liquid crystal layer (4) confined between the substrates (1). The optical incidence plane (31) to the cell (30) is so selected that the plane (31) is away from the helical axes (9) of the ferroelectric liquid crystal in the cell (30) in the order of somewhat greater than the tilt angle ($\theta_t$) of the ferroelectric liquid crystal. The pair of flat electrodes (2) generate a first electric field (37a) perpendicular to the layer (32) and orient the long axes of the ferroelectric liquid crystal molecules into a first orientation (35a') parallel to the layer (32) to induce a first refractive index which causes simultaneous reflection of unpolarized light beam (7+8) with a predetermined incidence angle ($\theta$). The two pair of comb shaped electrodes (33) generate a second electric field (37b') parallel to the layer and perpendicular to the helical axes (9) and orient the long axes of the molecules into a second orientation (35b') not in parallel to the layer (32) to induce a second refractive index which causes simultaneous transmission of the unpolarized light beam (7+8) with the predetermined incidence angle ($\theta$).

9 Claims, 5 Drawing Sheets

OPTICAL CHANGE-OVER SWITCH UTILIZING FERROELECTRIC LIQUID CRYSTAL MATERIAL

BACKGROUND OF THE INVENTION

1. Fields of the Invention

The present invention relates to an optical change-over switch employing a ferroelectric liqiud crystal. The optical change-over switch is used for switching or bypassing an optical transmission line in an optical transmission system and an optical communication system using optical fibers.

2. Description of the Prior Art

One of the conventional optical change-over switch types employing liquid crystal is disclosed in "Total switching of unpolarized fiber light with a four-port electro-optic liquid-crystal device" reported by R.A. Soref and D.H. McMahon in Optic letters, vol. 5, No. 4 (1980) pp. 147 to 149 and U.S. Pat. No. 4,278,327 issued to D. H. McMahon and R. A. Soref. The optical switch disclosed is composed of a nematic liquid crystal sandwiched between two glass prisms and A.C. electric field is applied between transparent electrodes which are provided on the surfaces of the opposing prisms in order to change the orientation of liquid crystal molecules, thereby changing the refractive index of the liquid crystal and change over the incident light between two directions. Since coupling of the applied electric field with the molecular orientation of the nematic liquid crystal is weak, the electro-optical response time for the disclosed optical changer-over switch is slow and the molecular orientation is not uniformly changed with the application of the electric field, particularly in the vicinity of the interfaces of the nematic liquid crystal with the substrates so that the cross-talk of the optical change-over switch is increased. Further since the input light beam to the optical change-over switch has to intersect twice, in other words double interaction, the nematic liquid crystal cell in order to change-over the light beam direction so that a light propagating loss is increased due to the long light propagating path. Still further, since the optical change-over switch is constructed to split the input light beam into S and P polarized components at the first intersect and to converge at the second intersect, constituent parts with high dimensional accuracy forming the light propagating path are necessitated.

U.S. Pat. No. 4,367,924 issued to Noel A. Clark et al. discloses a ferroelectric liquid crystal cell in combination with a pair of polarizers for a bistable light valve and a liquid crystal display device, but not for the optical change-over switches as in the present invention.

SUMMARY OF THE INVENTION

One object of the present invention is to provide an optical change-over switch employing ferroelectric liquid crystal and having a high electro-optical response time and a low cross-talk.

Another object of the present invention is to provide an optical change-over switch employing ferroelectric liquid crystal and having a low propagation loss and a simple structure suitable for changing over an unpolarized light beam.

An optical change-over switch according to one aspect of the present invention comprises an input port and an output port of a light beam containing at least an S polarization component, a ferroelectric liquid crystal cell for transmitting or reflecting at least the S polarization component emitted thereto with a predetermined incidence angle, orientation of molecules in the cell is controlled to take first and second stable positions to induce corresponding first and second refractive indices to respective polarization components thereby to cause the transmission or reflection of at least the S polarization component; and means for propagation the light beam from the input port to the ferroelectric liquid crystal cell and therefrom to the output port, the light propagating means defining an optical incidence plane to the surface of the ferroelectric liquid crystal cell so as to intersect the axes of helices of the ferroelectric liquid crystal, which are formed by the molecules in a bulk, with a predetermined angle of somewhat greater than the tilt angle of the ferroelectric liquid crystal so that the difference between the two refractive indices to at least the S polarization component is increased to ensure the change-over of the light beam emitted with the predetermined incidence angle.

An optical change-over switch according to another aspect of the present invention comprises an input port and an output port of a light beam containing at least a P polarization component, a ferroelectric liquid crystal cell for transmitting or reflecting at least the P polarization component emitted thereto with a predetermined incidence angle, orientation of molecules in the cell is controlled to take first and second stable positions to induce corresponding first and second refractive indices to respective polrization components thereby to cause the transmission or reflection of at least the P polarization components; and means for propagating the light beam from the input port to the ferroelectric liquid crystal cell and therefrom to the output port, the light propagating means defining an optical incidence plane to the surface of the ferroelectric liquid crystal cell so as to align parallel with axes of helices of the ferroelectric liquid crystal, which are formed by the molecules in a bulk, so that the difference between the two refractive indices to at least the P polarization component is increased to ensure the change-over of the light beam emitted with the predetermined incidence angle.

An optical change-over switch according to still further aspect of the present invention comprises an input port and an output port of an unpolarized light beam containing both S and P polarization components, a ferroelectric liquid crystal cell for transmitting or reflecting both S and P polarization components emitted thereto with a predetermined incidence angle, orientation of molecules in the cell is controlled to take first and second stable positions to induce corresponding first and second refractive indices to respective polarization components thereby to cause the transmission or reflection of both polarization components; and means for propagating the unpolarized light beam from the input port to the ferroelectric liquid crystal cell and therefrom to the output port, the light propagating means defines an optical incidence plane to the surface of the ferroelectric liquid crystal cell so as to intersect the axes of helices of the ferroelectric liquid crystal, which are formed by the molecules in a bulk, with a predetermined angle of somewhat greater than the tilt angle of the ferroelectric liquid crystal so that difference between the two refractive indices to respective polarization components is increased to ensure the change-over of the unpolarized light beam emitted with the predetermined incidence angle.

DESCRIPTION OF THE PREFERRED Embodiments

Figure 1:
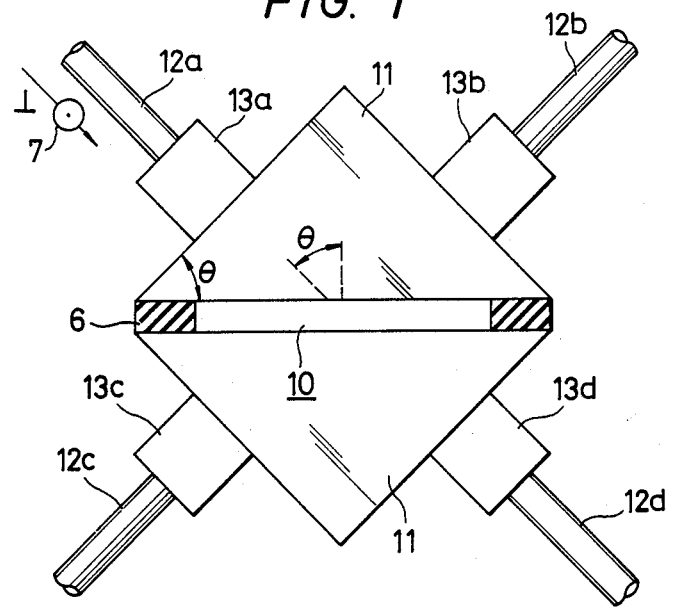
FIG. 1 shows a side view, partly in section, of first embodiment of the optical change-over switch according to the present invention.
Figure 3A:
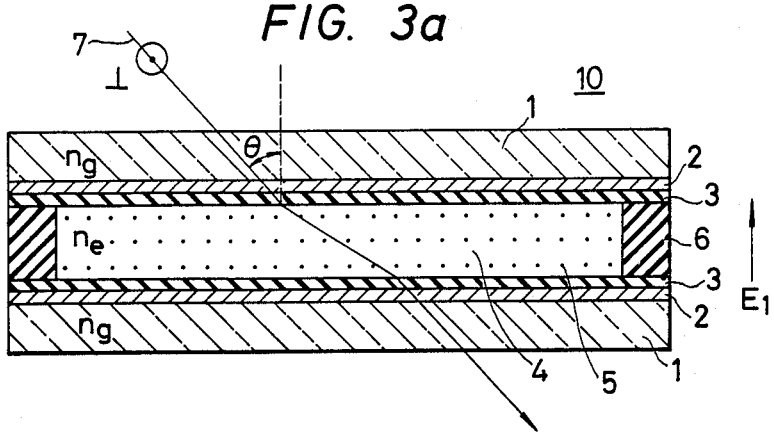
FIG. 3a is a cross sectional view of first ferroelectric liquid crystal cell having a first molecular orientation used in the optical change-over switches shown in FIGS. 1, 2a and 2b and is used for explaining the present invention.
Figure 3B:
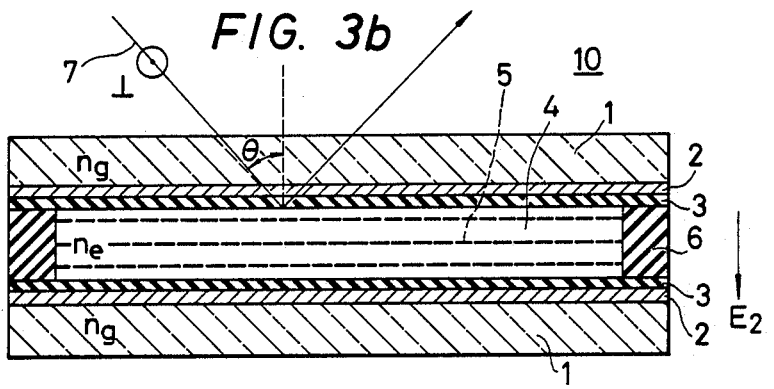
FIG. 3b is a cross sectional view of the same ferroelectric liquid crystal cell as shown in FIG. 3a having a second molecular orientation and is used for explaining the present invention.

The optical change-over switch shown in FIG. 1 is a bulk type optical change-over switch suitable for transmission and reflection of a light beam containing S polarization component. The optical change-over switch is composed of a pair of spaced apart triangular glass prisms 11, a ferroelectric liquid crystal cell 10 sandwiched between the pair of spaced apart triangular glass prisms 11, the details of the ferroelectric liquid crystal cell 10 is shown in FIGS. 3a and 3b, graded-index rod lenses 13a, 13b, 13c and 13d for collimation and decollimation attached to the respective slope faces of the pair of glass prisms 11, and single polarization optical fibers 12a, 12b, 12c and 12d coupled to the respective graded-index rod lenses 13a, 13b 13c and 13d. An input light 7 of S polarization enters through the single polarization optical fiber 12a and the graded-index rod lens 13a to the upper glass prism 11 and propagates therethrough to the surface of the ferroelectric liquid crystal cell 10 with a predetermined incidence angle Θ where the S polarization light 7 is transmitted to the graded-index rod lens 13d and the single polarization optical fiber 12d or reflected to the graded-index rod lens 13b and the single polarization optical fibers 12b depending upon the molecular orientation in the ferroelectric liquid crystal cell 10 which will be explained in detail with reference to FIGS. 3a and 3b.

Figure 2A:
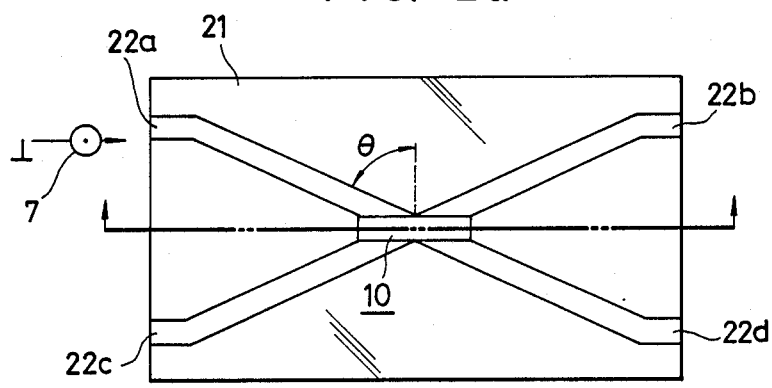
FIG. 2a shows a side view of second embodiment of the optical change-over switch according to the present invention.
Figure 2B:
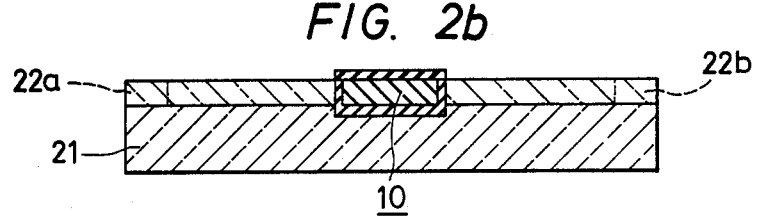
FIG. 2b is a cross sectional view of the optical change-over switch shown in FIG. 2a taken along the line indicated by the arrows.

FIGS. 2a and 2b show an optical wave guide type optical change-over switch having substantially the same function as of that shown in FIG. 1 and particularly suitable for integration. The optical change-over switch is composed of a glass substrate 21; 2×2 optical wave guide paths 22a, 22b, 22c and 22d formed on the glass substrate 21, refractive index of the optical wave guide paths 22a, 22b, 22c and 22d are selected larger than that of the substrate 21; and an ferroelectric liquid crystal cell 10 embedded at the intersection of the 2×2 optical wave guide paths 22a, 22b, 22c and 22d. The details of the ferroelectric liquid crystal cell 10 are shown in FIGS. 3a and 3b. An input light 7 of S polarization propagates to the surface of the ferroelectric liquid crystal cell 10 with a predetermined incidence angle θ where the S polarization light is transmitted to the optical wave guide path 22d or reflected to the optical wave guide path 22b depending upon the molecular orientation in the ferroelectric liquid crystal cell 10 like the embodiment shown in FIG. 1.

The ferroelectric liquid crystal cell 10 shown in FIGS. 3a and 3b is composed of a pair of spaced apart transparent substrates 1 made of SF10 optical glass whose refractive index $n_g$ is 1.8; transparent flat electrodes 2 formed on the facing surfaces of the respective transparent substrates 1; orientation control films 3 coated over the transparent flat electrodes 2; a ferroelectric liquid crystal layer 4 containing ferroelectric liquid crystal molecules 5 and sandwiched between the pair of transparent substrates 1; and a spacer 6 made of Mylar having thickness of 5 μm and having an injection hole for the ferroelectric liquid crystal interposed between the transparent substrates 1 for defining the thickness of the ferroelectric liquid crystal layer 4 and for sealing the ferroelectric liquid crystal therein. The pair of electrodes 2 generate first electric field $E_1$ and second electric field $E_2$ having opposite polarity with respect to the first electric field $E_1$ directing perpendicular to the ferroelectric liquid crystal layer 4 through application of DC pulse voltages of opposite polarities. Polyimide films are used for the molecular orientation control films 3 of which surfaces are rubbed to predetermined direction so as to orient long axes of all the molecules in the ferroelectric liquid crystal layer 4 to a specific direction. Further the orientation control films 3 maintains the initial orientation of molecules until a pulse like electric field is applied for changing the molecule orientation and thereafter the orientation control films 3 again maintains the changed orientation of molecules. The ferroelectric liquid crystal layer 4 filled between the transparent substrates 1 is a mixture of the following four chiral smectic C liquid crystals,

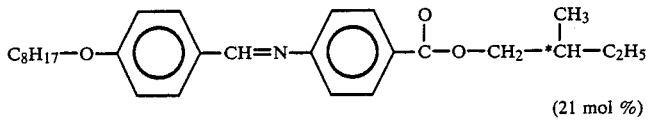

(21 mol %)

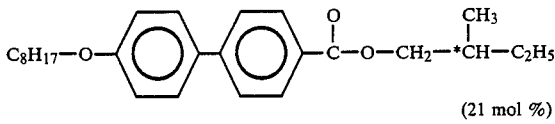

(21 mol %)

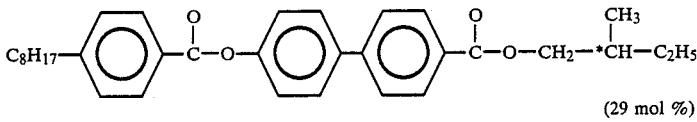

(29 mol %)

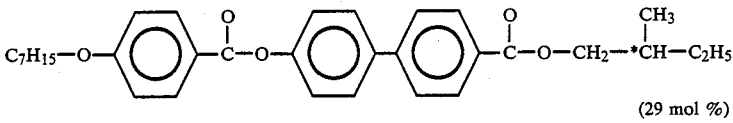

(29 mol %)

The phase change of the ferroelectric liquid crystal, the mixture of the above four, is as follows,

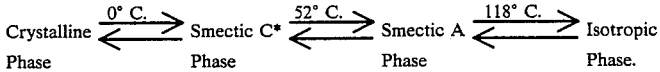

The ferroelectric liquid crystal used exhibits positive dielectric anisotropy.

Molecules of a ferroelectric liquid crystal align in a bulk so that the molecules form helices while maintaining long axes of the molecules to have a predetermined tilt angle $\theta_t$ with respect to the axes of the respective helices which is intrinsic to respective ferroelectric liquid crystal. The orientation control films 3 unwind the helical alignment of the ferroelectric liquid crystal molecules and orient the molecules to a specific direction while still maintaining the predetermined tilt angle $\theta_t$ of the long axes of the molecules with respect to the axes of the respective helices.

The tilt angle of the ferroelectric liquid crystal used in the embodiments of the present invention is 20° at room temperature.

The ferroelectric liquid crystal cell 10 is interposed between the pair of glass prisms 11 and arranged so that the imaginary axes of helices formed by the molecules intersect to the optical incidence plane defined by the glass prisms 11 with an angle of substantially the same or slightly larger than the tilt angle intrinsic to the ferroelectric liquid crystal.

The optical incidence plane in FIGS. 3a and 3b is parallel to the sheet of drawing and the oscillating direction of the S polarization light 7 is perpendicular to the optical incidence plane, in that, to the sheet of drawing as seen from FIGS. 3a and 3b.

In FIG. 3a the long axes of molecules 5 in the ferroelectric liquid crystal layer 4 are oriented parallel to the layer 4 and substantially perpendicular to the sheet of the drawing by an application of the pulse like first electric field $E_1$ wherein the oscillating direction of the S polarization light 7 coincides with the long axes of the molecules 5, in other words, the optical axes of the molecules 5, so that the ferroelectric liquid crystal layer 4, exhibits an extraordinary refractive index $n_e = 1.7$ to the S polarization light 7 with the incidence angle $\theta$ which is between 60° and 80°; thus transmits the S polarization light as shown.

The long axes of the molecules 5 in the ferroelectric liquid crystal layer 4 in FIG. 3b are reoriented parallel to the layer 4 and also substantially parallel to the sheet of the drawing by an application of the pulse like second electric field $E_2$ wherein the oscillating direction of the S polarization light 7 intersects with the long axes of the molecules 5 at right angle so that the ferroelectric liquid crystal layer 4 exhibits an ordinary refractive index $n_o = 1.5$ to the S polarization light 7 thus reflects the S polarization light 7 as shown.

In both molecule orientations explained in connection with FIGS. 3a and 3b, the tilt angle $\theta_t$ of the molecular long axes with respect to the respective helical axes is always kept unchanged.

The operating characteristic data of the optical change-over switch shown in FIGS. 1 and 2 using the ferroelectric liquid crystal cell shown in FIGS. 3a and 3b is as follows, Driving voltage for generating the electric fields: DC 15V (5ms pulse voltage), Change-over time between first and second orientations : 0.1ms, and Cross-talk level : —20dB .

Although, in the ferroelectric liquid crystal cell 10 shown in FIGS. 3a and 3b, the transparent substrates 1 other than the glass prisms 11 and the optical wave guide paths 22a, 22b, 22c and 22d shown in FIGS. 1, 2a and 2b are used for confining the ferroelectric liquid crystal, the glass prisms 11 and the optical wave guide paths 22a, 22b, 22c and 22d themselves can be used as the substrates which is true with respect to all the other embodiments below.

Since the molecules 5 in the ferroelectric liquid crystal layer 4 of the ferroelectric liquid crystal cell 10 shown in FIGS. 3a and 3b always remain in the same plane even when subjected to the application of an electric field of opposite polarity, no change of the refractive index of the ferroelectric liquid crystal layer 4 to P polarization light is induced oscillating direction of which is parallel to the optical incidence plane thus no change over of the P polarization light between transmission and reflection is effected.

Figure 4:
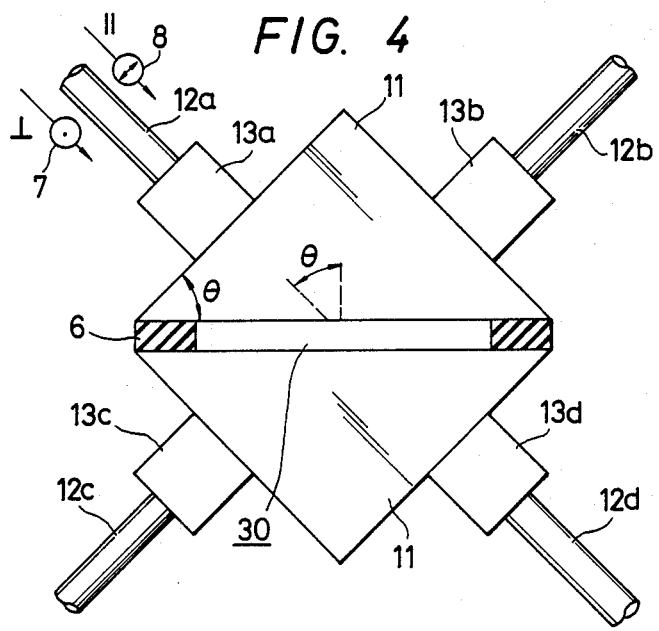
FIG. 4 is a side view, partly in section, of third embodiment of the optical change-over switch according to the present invention.

The optical change-over switch shown in FIG. 4 is a bulk type optical change-over switch suitable for transmission and reflection of both polarized lights, that is P polarization light as well as s polarization light.

In the optical change-over switch shown in FIG. 4, same numerals as in FIG. 1 denote the the same or equivalent components as in FIG. 1. One of the major differences is that the pair of glass prisms sandwiches a ferroelectric liquid crystal cell 30 other than the ferroelectric liquid crystal cell 10. Details of the ferroelectric liquid crystal cell 30 are shown in FIGS. 5a and 5b, where components equivalent to those shown in FIGS. 3a and 3b are given same reference numerals as are used in FIGS. 3a and 3b.

Figure 5A:
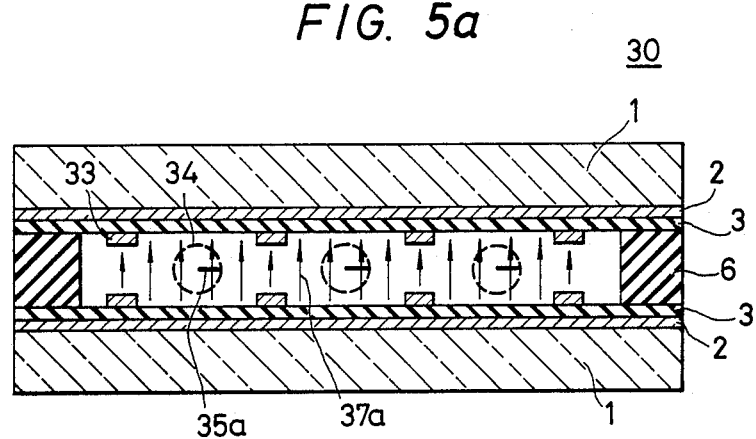
FIG. 5a is a cross sectional view of second ferroelectric liquid crystal cell having a first molecular orientation used in the optical change-over switch shown in FIG. 4 and is used for explaining the present invention.
Figure 5B:
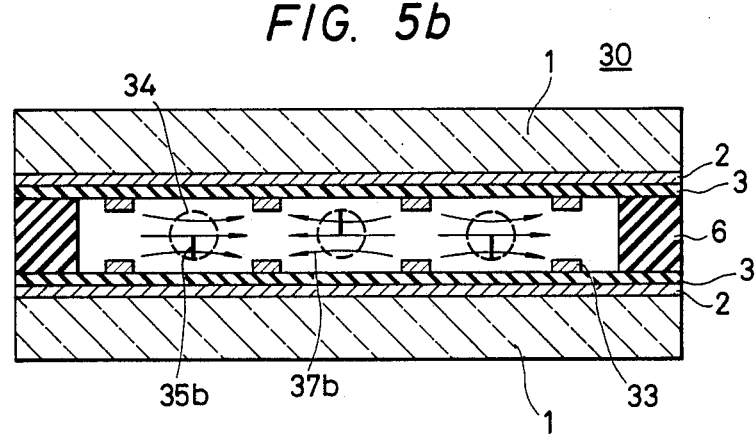
FIG. 5b is a cross sectional view of the same ferroelectric liquid crystal cell as shown in FIG. 5a having a second molecular orientation and is used for explaining the present invention.

One major difference of the ferroelectric liquid crystal cell 30 shown in FIGS. 5a and 5b from that shown in FIGS. 3a and 3b is the addition of two pair of comb shaped electrodes 33 provided respectively on the orientation control films 3 for generating an electric field parallel to the ferroelectric liquid crystal layer.

The ferroelectric liquid crystal cell 30 is interposed between the pair of glass prisms 11 and arranged so that the imaginary axes of helices formed by the molecules coincide with the optical incidence plane defined by the glass prisms 11.

Figure 6:
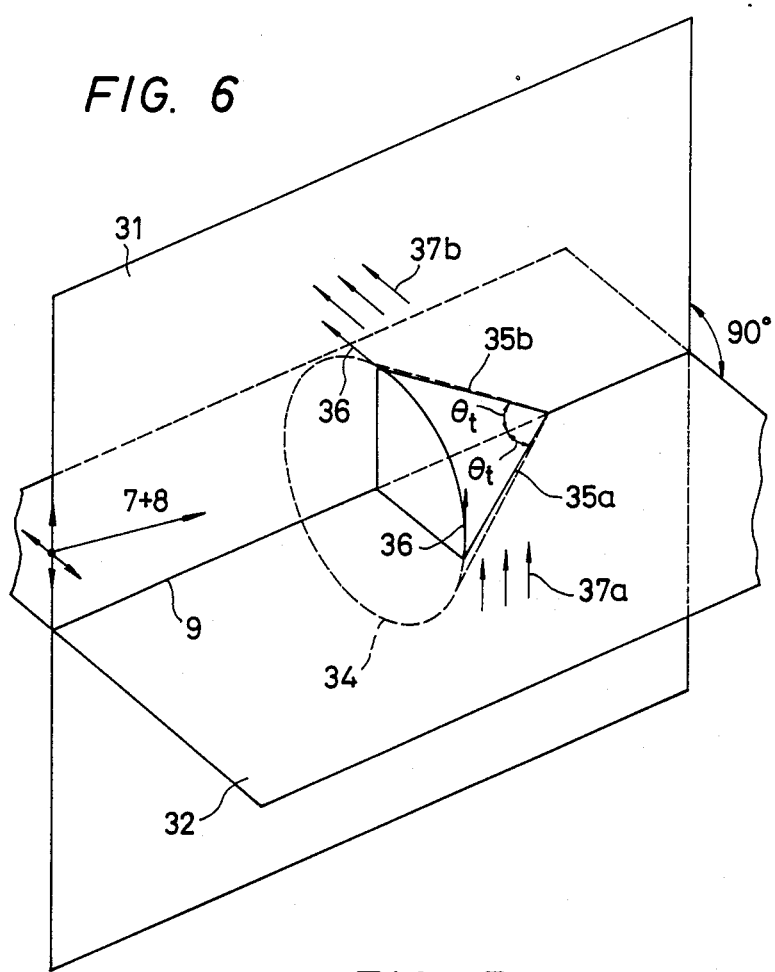
FIG. 6 is an explanatory diagram illustrating movement and orientation of the ferroelectric lqiuid crystal molecules in the ferroelectric liquid crystal cell shown in FIGS. 5a and 5b and used in the optical change-over switch shown in FIG. 4 in dependence with the direction of applied electric field for explaining the present invention.

The operation of the ferroelectric liquid crystal cell 30 is explained with reference to FIG. 6 which illuustrates movement and orientation of one selected molecule in dependence with applied electric field.

The plane 32 which is parallel to the ferroelectric liquid crystal layer 4, or in more strict, parallel to the interface between the ferroelectric liquid crystal layer 4 and the transparent substrate 1 is perpendicular to the optical incidence plane 31 with which the helical axis 9 coincides or is parallel. The dotted cone 34 indicates the locus of possible orientations of the molecule. When a first electric field 37a perpendicular to the layer is applied through the pair of flat electrodes 2 and the two pair of comb shaped electrodes 33, the molecule takes a first orientation 35a which is in the plane 32 while retaining the tilt angle $\theta_t$ with respect to the helical axis 9, wherein the direction of electric dipole 36 of the molecule aligns with the direction of the electric field 37a. When a second electric field 37b parallel to the layer is applied through the two pair of comb shaped electrodes 33, the molecule takes a second orientation 35b which is in the optical incidence plane while retaining the tilt angle $\theta_t$ with respect to the helical axis 9 and the plane 32, wherein the direction of electric dipole 36 of the molecule aligns with the direction of the electric field 37b. The change of molecular orientation from the first orientation 35a to the second orientation 35b in the ferroelectric liquid crystal layer induces refractive index difference to both S and P polarization lights 7 and 8 thus causes change-over from transmission to reflection for the S polarization light 7 and from reflection to transmission for the P polarization light 8.

The operation characteristic data of the optical change-over switch shown in FIG. 4 using the ferroelectric liquid crystal cell shown in FIGS. 5a and 5b is as follows, Driving voltage for generating the electric field : DC 15V (5 ms pulse voltage), Change-over time between first and second orientations : 0.05 ms, and Cross-talk level: −20 dB .

Figure 7:
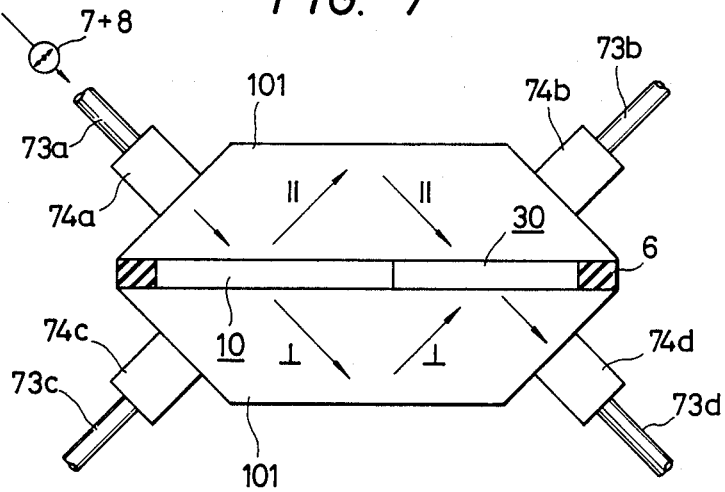
FIG. 7 is a side view, partly in section, of a fourth embodiment of the optical change-over switch according to the present invention.

The optical change-over switch shown in FIG. 4 causes the change-over between transmission and reflection for both S and P polarization lights independently but not simultaneously as explained FIG. 7 shows a bulk type optical change-over switch suitable for transmission and reflection of unpolarized light. The optical change-over switch is composed of a pair of spaced apart trapezoidal glass prisms 101, two ferroelectric liquid crystal cells 10 and 30 shown respectively in FIGS. 3a and 3b and 5a and 5b sandwiched between the pair of spaced apart trapezoidal glass prisms 101, graded-index rod lens 74a, 74b, 74c and 74d for collimation and decollimation attached to the respective slope faces of the pair of glass prisms 101 and multimode optical fibers 73a, 73b, 73c and 73d coupled to the respective graded-index rod lenses 74a, 74b, 74c, and 74d.

The ferroelectric liquid crystal cell 10 disposed between the pair of the glass prisms 101 is arranged so that the imaginary axes of the helices formed by the molecules intersect to the optical incidence plane defined by the glass prisms 101 with an angle of subtantially the same or slightly larger than the tilt angle of the ferroelectric liquid crystal like the optical change-over switch shown in FIG. 1, and the ferroelectric liquid crystal cell 30 between the pair of the glass prisms 101 is arranged so that the imaginary axes of helices formed by the molecules coincide with the optical incidence plane defined by the glass prisms 101 like the optical change-over switch shown in FIG. 4.

An unpolarized input light 7+8 enters through the multimode optical fiber 73a and the graded-index rod lens 74a to the upper glass prism 101 and propagates therethrough to the surface of the ferroelectric liquid crystal cell 10, since the molecules therein are oriented as show in FIG. 3a, the S polarization light transmits through the cell 10 and the P plarization light reflect from the cell 10, both the S and P polarization lights are reflected at the respective top parallel surfaces of the respective trapezoidal glass prisms 101 and propagate to the parallel opposing surfaces of the ferroelectric liquid crystal cell 30, where, since the molecules therein are oriented to the second orientation 35b, the P polarization light transmits through the cell 30 and the S polarization reflects thereat and both emerge together through the graded-index rod lens 74d and the multimode optical fiber 73d. When the first orientation is selected in the cell 30, both P and S polarization lights emerge through the graded-index rod lens 74b and the multimode optical fiber 73d.

The operation characteristic data of the optical change-over switch shown in FIG. 7 is as follows, Driving voltage for generating the electric field: DC 15V (5 ms pulse voltage), Change-over time between first and second orientations : 0.05 ms, and Cross-talk level: −17 dB .

Figure 8:
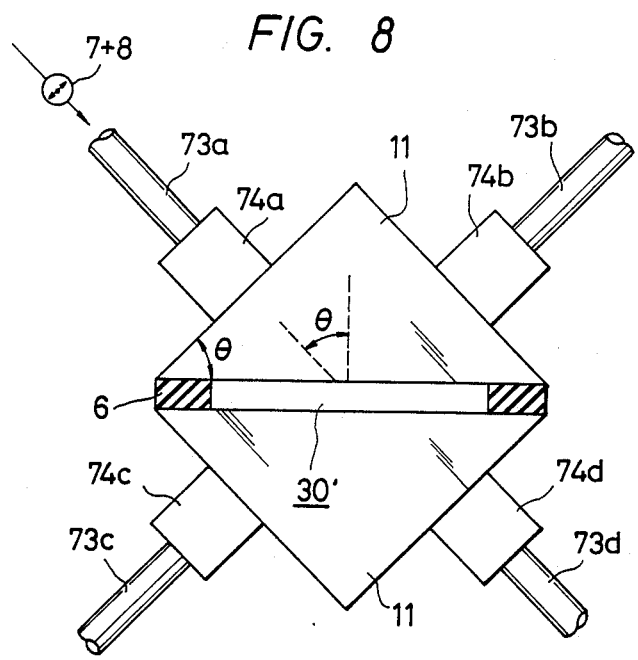
FIG. 8 is a side view, partly in section, of a fifth embodiment of the optical change-over switch according to the present invention.

FIG. 8 shows an optical change-over switch with a simple structure suitable for transmission and reflection of unpolarized light. The same reference numerals as of FIGS. 4 and 7 indicate the same or equivalent components as those shown in FIGS. 4 and 7.

One of the major difference of the optical change-over switch shown in FIG. 8 from that shown in FIG. 4 is the relative arrangement of the ferroelectric liquid crystal cell 30' shown in FIGS. 5a and 5b with respect to the optical incidence plane 31 in that the ferroelectric liquid crystal cell 30' disposed between the pair of glass prisms 11 is arranged so that the imaginary axes of the helices formed by the molecules intersect to the optical incidence plane 31 defined by the glass prism 11 with an angle of substantially the same or slightly larger than the tilt angle $\theta_t$ intrinsic to the ferroelectric liquid crystal employed like the optical change-over switch shown in FIG. 1.

Figure 9:
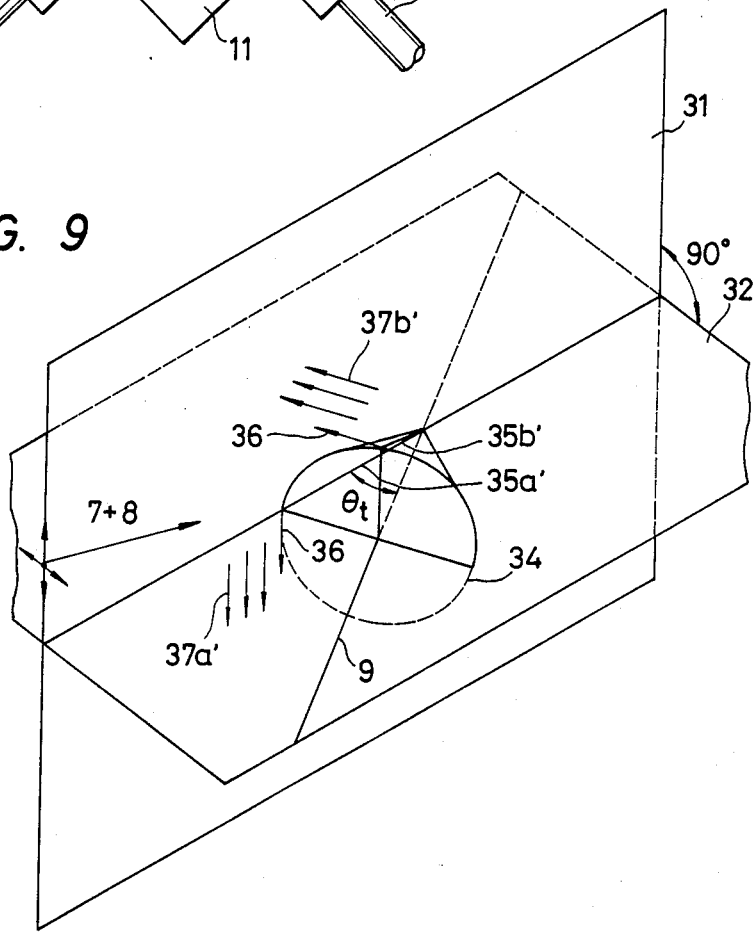
FIG. 9 is an explanatory diagram illustrating movement and orientation of the ferroelectric liquid crystals molecules in the ferroelectric liquid crystal cell shown in FIGS. 5a and 5b and used in the optical change-over switch shown in FIG. 8 in dependence with the direction of applied electric field for explaining the present invention.

The operation of the ferroelectric liquid crystal cell 30' is explained with reference to FIG. 9 which illustrates movement and orientation of one selected molecule in dependence with applied electric field. The same reference numerals in FIGS. 9 as of FIG. 6 indicated the same or equivalent components as those shown in FIG. 6. When a first electric field 37a' perpendicular to the layer is applied through the pair of flat electrodes 2 and the two pair of comb shaped electrodes 33, the molecule takes a first orientation 35a' which is in both the plane 32 and the optical incidence plane 31 while retaining the the tilt angle $\theta_t$ with respect to the helical axis 9. When a second electric field 37b' parallel to the layer and perpendicular to the helical axis 9 is applied through the two pair of comb shaped electrodes 33, the molecule takes a second orientation 35b' which is out of both the plane 32 and the optical incidence plane 31 while retaining the tilt angle $\theta_t$ with respect to the helical axis 9 and the plane 32.

The change of molecular orientation from the first orientation 35a' to the second orientation 35b' in the ferroelectric liquid crystal layer induces similar refractive index difference to both polarizations 7+8 thus causes simultaneous change-over from reflection to transmission of the unpolarized light, such that when the first orientation 35a' is selected, the unpolarized light is reflected at the surface of the ferroelectric liquid crystal cell 30' and emerges through the graded-index rod lens 74b and the multimode optical fiber 73b, and when the second orientation 35b' is selected, the unpolarized light is transmitted through the cell 30' and emerges through the graded-index rod lens 74d and the multimode optical fiber 73d.

The operation characteristic data of the optical change-over switch shown in FIG. 8 using the ferroelectric liquid crystal cell shown in FIGS. 5a and 5b is as follows, Driving voltage for generating the electric field: DC 15V (5 ms pulse voltage), Change-over time between first and second orientations: 0.05 ms and , Cross-talk level : −20 dB.

We claim:

1. An optical change-over switch comprising,
    an input port and an output port for a light beam having at least one of S and P polarization components;
    a liquid crystal cell for reflection and transmission of the light beam, said liquid crystal cell including a pair of spaced-apart first and second transparent substrates having respective opposed first and second parallel surfaces, a ferroelectric liquid crystal layer confined between said first and second transparent substrates, and means for controlling orientation of molecules in the ferroelectric liquid crystal layer into a first molecule orientation inducing a first refractive index of the ferroelectric liquid crystal layer to the respective polarization components of the incidence light beam so as to transmit at least one of said S and P polarization components of the incidence light beam and into a second molecule orientation inducing a second refractive index of the ferroelectric liquid crystal layer to the respective polarization components of the incidence light beam so as to reflect at least one of said S and P polarization components of the incidence light beam; and
    means for propagating the light beam from said input port to said liquid crystal cell and therefrom to said output port, the angle of the optical incidence plane defined by said light beam propagating means with respect to helical axes of the ferroelectric liquid crystal in said liquid crystal cell is so selected that the difference between the first and second refractive index ensures the change-over of at least one of said S and P polarization components of the incidence light beam.

2. The optical change-over switch according to claim 1, wherein said molecule orientation controlling means includes a pair of flat transparent electrodes provided respectively on the first surface of said first transparent substrate and on the second surface of said second transparent substrate, orientation control films respectively provided on said pair of flat transparent electrodes and a pair of comb shaped transparent electrodes provided on at least one of said orientation control films, and wherein said pair of transparent flat electrodes generates a first electric field having a first direction perpendicular to said ferroelectric liquid crystal layer which causes the first molecule orientation in which long axes of the molecules are parallel to said layer, said pair of comb shaped transparent electrodes generates a second electric field having a second direction parallel to said layer and perpendicular to the helical axes of the ferroelectric liquid crystal which causes the second molecule orientaton in which long axes of molecules are not parallel to said layer.

3. An optical change-over switch comprising,
    an input port and an output port for a light beam having at least one of S and P polarization components;
    a liquid crystal cell for reflection and transmission of the light beam, said liquid crystal cell including a pair of spaced-apart first and second transparent substrates having respective opposed first and second parallel surfaces, a ferroelectric liquid crystal layer confined between said first and second transparent substrates, and means for controlling orientation of molecules in the ferroelectric liquid crystal layer into a first molecule orientation with long axes of the molecules being oriented for inducing a first refractive index of the ferroelectric liquid crystal layer to the respective polarization components of the incidence light beam so as to transmit at least one of said S and P polarization components of the incidence light beam and into a second molecule orientation with long axes of the molecules being oriented for inducing a second refractive index of the ferroelectric liquid crystal layer to the respective polarization components of the incidence light beam so as to reflect at least one of said S and P polarization components of the incidence light beam; and
    means for propagating the light beam from said input port to said liquid crystal cell and therefrom to said output port, the angle of the optical incidence plane defined by said light beam propagating means with respect to helical axes of the ferroelectric liquid crystal in said liquid crystal cell being substantially the same as the tilt angle ($\theta_t$) between the long axes of the molecules and the respective helical axes of the ferroelectric liquid crystal so that the difference between the first and second refractive index ensures the change-over of at least one of said S and P polarization components of the incidence light beam.

4. The optical change-over switch according to claim 3, wherein said molecule orientation controlling means includes a first pair of transparent electrodes generating a first electric field having a first direction perpendicular to said ferroelectric liquid crystal layer which causes the first molecule orientation in which long axes of the molecules are in parallel to said layer.

5. The optical change-over switch according to claim 4, wherein said first pair of transparent electrodes further generate a second electric field having a second direction opposite to the first electric field which causes the second molecule orientation substantailly perpendicular to the first molecule orientation in which long axes of the molecules remain parallel to said layer.

6. The optical change-over switch according to claim 4, wherein said molecule orientation controlling means further includes a second pair of transparent electrodes generating a second electric field having a second direction parallel to said layer and perpendicular to the helical axes of the ferroelectric liquid crystal which causes the second molecule orientation in which long axes of molecules are not parallel to said layer.

7. The optical change-over switch according to claim 6, wherein said first pair of electrodes comprises a pair of flat electrodes provided respectively on the first surface of said first transparent substrate and on the second surface of said second transparent substrate.

8. The optical change-over switch according to claim 7, wherein orientation control films are respectively provided on said pair of flat electrodes.

9. The optical change-over switch according to claim 8, wherein said second pair of electrodes comprises a pair of comb shaped electrodes provided on at least one of said orientation control films.

* * * * *